Inventor.
John P. Magos.
By Joseph O. Lange
Atty.

Feb. 26, 1963

J. P. MAGOS 3,078,871

GATE CLOSURE GUIDE

Filed Jan. 13, 1960

Inventor:
John P. Magos.
By Joseph O. Large
Atty.

1

3,078,871
GATE CLOSURE GUIDE
John P. Magos, Wilmette, Ill., assignor to Crane Co., Chicago, Ill., a corporation of Illinois
Filed Jan. 13, 1960, Ser. No. 2,140
1 Claim. (Cl. 137—546)

This invention relates generally to valves. More particularly, it is concerned with a gate valve with a novel guide for the closure member.

Heretofore, it has been one of the problems of prior valve constructions to provide for one adaptable for use with a single valve trim for use on either steam, oil or general services, and the provision therefor of a valve guide and closure construction having extensive durability and relative simplicity has long been desired. Therefore, it is one of the more important objects of this invention to provide a gate valve arrangement of parts, for example, in which the body seat rings can easily be pre-machined with the usual required tapered seat facing and with a bottom fluid tight sealing surface subsequently with the valve casing. They are preferably welded in a further fluid sealing manner to an annular surface shouldered in the valve casing and extending substantially parallel to the vertical center line of the valve.

In combination with such seating arrangement, it is therefore another object of this invention to provide for a valve guide construction in which a horseshoe type or U-guide may be employed. The latter member is also preferably pre-machined before its assembly with the valve casing and fits into or is received within a machined slot or groove in the valve body.

It is a further important object of this invention to provide for a valve seating construction in which the body seat ring can easily be accurately measured or gauged using as the basis for such measurement said machined slot within the valve casing, and in which full and extended guiding of the valve closure member or disc at the casing sides and at the bottom thereof are fully provided when the valve gate or closure member is being seated.

Another object is to provide for the type of valve body in combination with the valve seating described in which the design of the valve body is relatively simple to machine on a horizontal plane without involving the more complicated arrangements for seating on a taper or inclined angle from the vertical plane, and further providing a construction in which the seats in the valve body can be accurately gauged from easily finished surfaces in the said body.

Other objects and advantages of this invention will become more readily apparent upon proceeding with the specification read in light of the accompanying drawings, in which:

FIG. 3 is a transverse sectional view taken substantially on the line 3—3 of FIG. 1.

Figure 1:
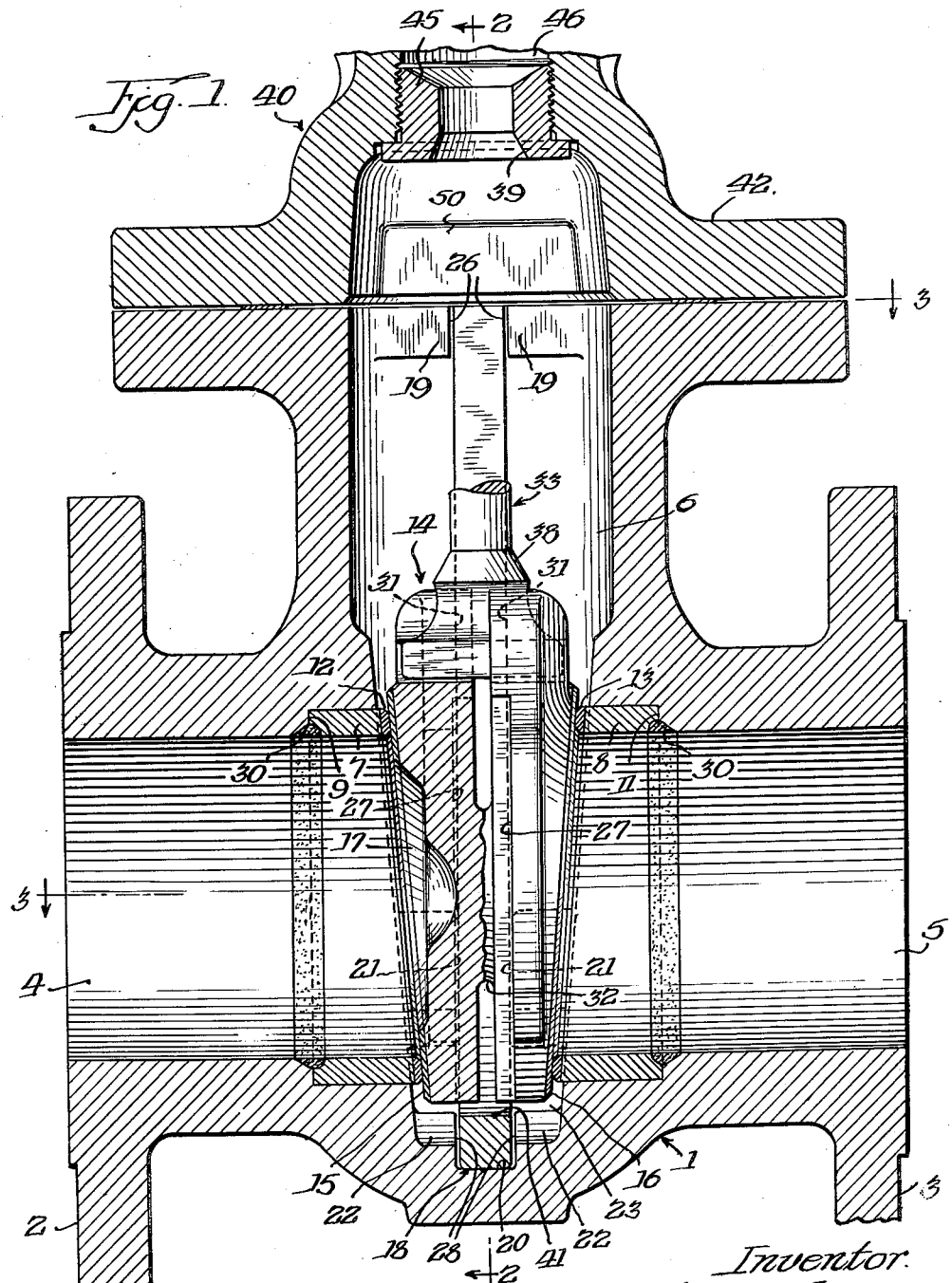
FIG. 1 is a fragmentary sectional assembly view of a preferred embodiment of my invention.

Referring now to FIG. 1, the valve body, generally designated 1, is shown having the usual end flange connections at 2 and 3 for effecting the conventional attachment to a pipe line (not shown). Obviously, other forms of pipe line attachment may be used without affecting the invention. The valve casing or body 1 is provided with the usual ports 4 and 5 communicating with the respective pipe line means and also having at the center of the valve casing the intermediate valve chamber 6. The said chamber at its upper portion is substantially elongated with relation to the vertical center line to receive the valve closure member as hereinafter described and as shown more clearly in FIG. 3.

At the oppositely disposed lower end portions of the said chamber, the valve seat rings 7 and 8 (FIG. 1) are abuttingly received on the respective shouldered portions at 9 and 11 respectively in the valve casing, having at their innermost limits of extension within the valve chamber the valve seat facings 12 and 13. It will be noted that the body rings 7 and 8 are made with inner tapered annular biased portions defined by the said valve seat facings, thereby to provide for the tapered engagement by the valve closure member, generally designated 14. The said closure member is similarly tapered with its valve seat facings or contacts as indicated at 15 and 16.

It will now be appreciated that when line fluid pressure flows through the valve and therefore is applied against the transversely extending tapered surfaces provided by the seats 15 and 16 as well as against the recesses oppositely disposed at 17, there will normally be a tendency for the valve closure member to rub against the seat ring on the downstream side and thus abrade and sometimes seriously injure the seat facing.

Figure 2:
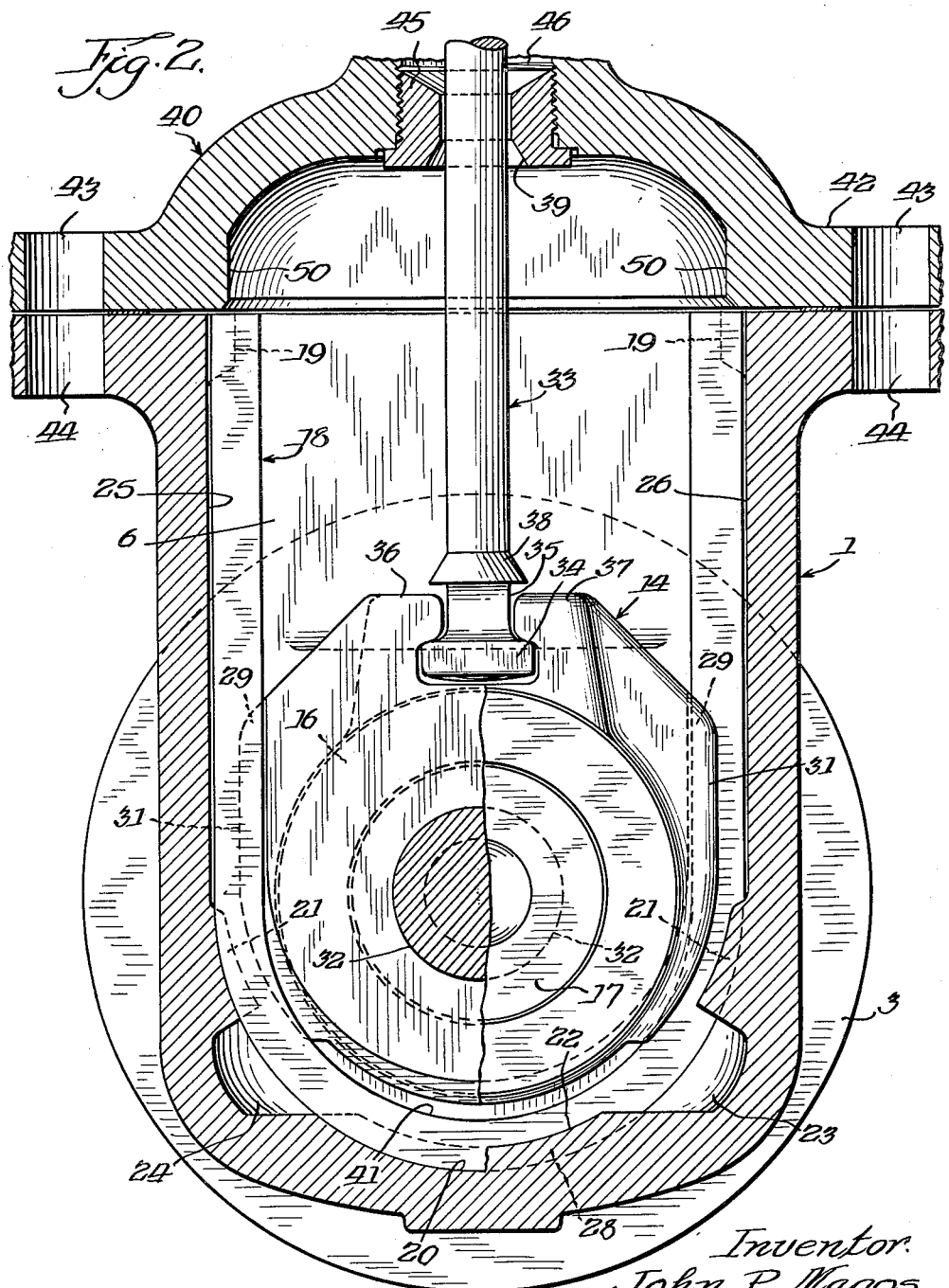
FIG. 2 is a sectional view taken on the line 2—2 of FIG. 1.

Accordingly, in order to guard against such objectionable occurrence, a U-guide or horseshoe member generally designated 18 is provided relatively closely fitted and supported at surface 20 within the valve body, as indicated more clearly in FIG. 2. At its upper portion within said body the said U-member is received between the oppositely disposed body lugs 19 and at lower side portions by the body lugs 21. The arcuately extending surface 22 at the bottom of the valve body defines a further positioning means for the guide 18. The bonnet lugs 50 project over the body opening 6 to limit any substantial upward movement of the U-guide member 18 beyond body guide lugs 19.

It will be apparent that the latter spaced-apart guide positioning portions are preferably recessed at suitably selected lower pocket portions in the casing, as indicated at 23 and 24, to receive the usual accumulations resulting from line deposits, sediment, foreign matter and the like, and thus function in such capacity without impairing the accurate positioning in the casing of the U-guide member 18.

It will be noted that between the respective members as at 25 and 26, the valve casing is accurately machined whereby to further support and guide the U-member 18 in its limited endwise positioning. Similarly, as shown more clearly in FIG. 1 at spaced-apart casing portions designated 26, 27, and 28, the guide member 18 is held firmly against side movement relative to the casing central axis.

The closure member 14 at 29 and 31 is relatively closely machined to fit the guide 18 to assure smooth sliding engagement of the closure member 14 against the guide 18 during the course of its reciprocating movement.

The said closure member is preferably of the well-known resilient type and is provided with the internal centrally positioned strut 32 integrally connecting each half portion of the closure member and imparting to the said closure member a relatively high degree of resiliency. The last named attribute provides the flexibility to the closure member to deform predeterminately in suitably seating itself in accurately coinciding with the contacting seat members at facings 12 and 13. Of course, the latter structural provision is necessary in order to make certain that tight seat contacts prevail at the upper and lower portions of the annular taper of the valve seats when engaging the said closure member 14.

The seat rings 7 and 8, while indicated as being weld-sealed annularly, as at 30, may be threadedly attached to the valve casing of desired, the important consideration here being that the valve seat rings are shouldered as at 11 to bring about accurate and fluid-tight positioning of the said rings with respect to their gauging when measured against the U-guide 18.

The valve closure member is attached in the conventional manner to a reciprocally movable valve stem generally designated 33, having the T-head 34 at its lowermost limit, the neck thereof 35 (FIG. 2) being engaged by the side disposed arms 36 and 37 of the closure member 14. Above the stem neck 35, a back seating collar with an annular tapered surface portion designated 38 is provided for engagement when in the open position of the valve with the annularly tapered coinciding surface 39 in the valve bonnet generally designated 40. The latter member is provided with a suitable flange 42 and the openings 43 to receive bolts (not shown) to engage similarly the bolt openings 44 of the valve casing 1. While the annular sealing surfaces 39 are shown as being part of a separate member, such as the stem hole bushing 45, it will of course be appreciated that an integral bonnet construction may be employed instead of the stem hole bushing 45 shown. Above the said latter member, the usual stuffing box 46 for containing packing (not shown) is provided positioned around a portion of the stem 33.

It will be of course appreciated that the body seat rings 7 and 8 when being installed are accurately positioned with respect to the central U-guide 18 before being fixedly located or welded in position as shown. The said body seat rings are suitably rotated before finally fixing their position in order to make certain that the respective taper of the members 12 and 13 coincide accurately with the angularity of the seating surfaces 15 and 16 of the closure member 14.

It is important in appreciating the significance of this invention to understand that the seats for the valve must necessarily be in accurate alignment to provide for the proper seating load on each side of the valve closure member, while at the same time enabling the guide 18 to center or to align the valve closure member 14 during the course of its reciprocating movement along the U-guide in opening and closing the valve. It should also be noted that the side disposed ears 31 extending downwardly for a substantial portion on each side of the said closure member below the horizontal axis of the closure member and thus provide for the guiding engagement of the closure member at 41 just imminent to the latter member effecting the final seating of the valve.

The single embodiment illustrated is but a single example of a number of possible adaptations of this type of valve structure, and therefore the scope of the invention should be measured by the appended claim.

I claim:
In a gate valve;
(a) the combination of a valve body with oppositely disposed spaced apart lugs projecting inwardly in different horizontal planes from inner side wall surfaces thereof;
(b) a reciprocally movable closure member therefor with oppositely disposed tapered seating surfaces;
(c) body seat rings within the said valve body for engaging said seating surfaces of the said closure member in effecting the gate valve closed position;
(d) guide means limitedly movable axially in the valve body for engaging the said closure member during said reciprocating movement of the latter member;
(e) the said guide means being relatively closely received within relieved portions of the said spaced-apart body lugs;
(f) the said body seat rings having their inner limits defined by substantially transversely extending surfaces extending in a plane coinciding with the tapered seating surfaces of the said closure member;
(g) the said body lugs providing spaced-apart engaging means in the bottom and side interior portions of the body positioned axially on the valve central axis for receiving said guide means for the closure member;
(h) oppositely disposed relieved pocket means formed in the body wall portion between said bottom and said side wall lugs and underlying the outer peripheral surface of said guide means for receiving sedimentary deposits and line accumulations scraped off and deposited by the closure member;
(i) the said guide means being of substantially U-form in cross-section with opposite legs of uniform section and having the lower curved portion of the U-form spaced from the outer walls of the body and defining the inner limits of said pocket means;
(j) the outer end limits of the legs of said guide means lying in a plane also defining the outer end limits of said body.

References Cited in the file of this patent
UNITED STATES PATENTS

| | | |
|---|---|---|
| 409,334 | Powell | Aug. 20, 1889 |
| 762,436 | Osgood | June 14, 1904 |
| 1,886,139 | Wells | Nov. 1, 1932 |
| 2,253,888 | Carlson | Aug. 26, 1941 |
| 2,797,063 | Hobbs | June 25, 1957 |
| 2,815,187 | Hamer | Dec. 3, 1957 |